United States Patent
Yoneyama et al.

(10) Patent No.: US 9,185,253 B2
(45) Date of Patent: Nov. 10, 2015

(54) IMAGE READING APPARATUS

(71) Applicant: CANON KABUSHIKI KAISHA, Tokyo (JP)

(72) Inventors: Hiromasa Yoneyama, Chigasaki (JP); Hideaki Matsumura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/281,658

(22) Filed: May 19, 2014

(65) Prior Publication Data

US 2014/0347712 A1    Nov. 27, 2014

(30) Foreign Application Priority Data

May 21, 2013    (JP) .................. 2013-107470

(51) Int. Cl.
*H04N 1/04* (2006.01)
*H04N 1/00* (2006.01)

(52) U.S. Cl.
CPC ......... *H04N 1/0057* (2013.01); *H04N 1/00816* (2013.01); *H04N 2201/0081* (2013.01); *H04N 2201/0093* (2013.01); *H04N 2201/0422* (2013.01)

(58) Field of Classification Search
CPC ............ H04N 1/0057; H04N 1/00816; H04N 2201/0081; H04N 2201/0093; H04N 2201/0422
USPC .................. 358/498, 497, 448, 474
See application file for complete search history.

(56) References Cited

U.S. PATENT DOCUMENTS

2009/0268258 A1* 10/2009 Yoshizawa .................. 358/448

FOREIGN PATENT DOCUMENTS

JP    2006-109408 A    4/2006

* cited by examiner

*Primary Examiner* — Houshang Safaipour
(74) *Attorney, Agent, or Firm* — Canon USA Inc. IP Division

(57) ABSTRACT

A reading unit of an image reading apparatus has a configuration in which a plurality of line sensors, including a first line sensor and a second line sensor that are arranged apart, are regularly arranged. The relation $0.95 \leq L/(n \times D) \leq 1.05$ (n=integer from 1 to 5) is satisfied where L is a distance between the first line sensor and the second line sensor in a sub scan direction. Before reading a document, the image reading apparatus detects an edge of the document, from which an image is to be actually read, using the first line sensor and the second line sensor to acquire correction information about document reading.

12 Claims, 12 Drawing Sheets

IMAGE READING APPARATUS

BACKGROUND OF THE INVENTION

1. Field of the Invention

The present invention relates to an image reading apparatus that reads an image on a document using line sensors.

2. Description of the Related Art

Attention has been paid to an image reading apparatus that reads a large-format document (for example, A0 size, B0 size). Japanese Patent Application Laid-Open No. 2006-109408 discusses an image reading apparatus that includes a reading unit in which a plurality of line image sensors is arranged in the staggered pattern along the document conveyance direction.

In many cases, a roller used for the document conveyance on such an image reading apparatus is one undivided conveyance roller. However, as the roller becomes longer, the document conveyance accuracy tends to vary due to variations in diameter, eccentricity, deflection of the roller axis caused by the self-weight of the roller, and torsion of the roller during document conveyance. Therefore, the positional deviations in the joint portions of a read-image become irregular and vary at a non-periodic interval. The larger the format is, that is, the longer the conveyance roller is, the more obvious the problem becomes.

In addition, the image reading apparatus discussed in Japanese Patent Application Laid-Open No. 2006-109408 makes adjustment to eliminate positional deviations in the joint portions of a read-image that are caused by relative deviations among the line image sensors arranged apart in the document conveyance direction. To perform this adjustment, an adjustment sheet, on which a dedicated pattern is formed, is prepared in advance. Before use, the image reading apparatus reads the pattern from the sheet to perform pre-adjustment. The user may feel it very cumbersome to perform such a pre-adjustment operation because it has nothing to do with a reading operation.

SUMMARY OF THE INVENTION

The present invention is directed to an image reading apparatus capable of reading a document accurately even when the roller becomes longer as the format of a document becomes larger.

The present invention is also directed to an image reading apparatus capable of reading a wide document accurately without having to use a special adjustment sheet.

According to an aspect of the present invention, an image reading apparatus includes a reading unit having a configuration in which a plurality of line sensors, including a first line sensor and a second line sensor arranged apart in a first direction, are regularly arranged along a second direction intersecting with the first direction, and a unit configured to move a document relative to the reading unit in a first direction using a roller, wherein a relation of $0.95 \leq L/(n \times D) \leq 1.05$ (n=integer from 1 to 5) is satisfied where L is a distance between the first line sensor and the second line sensor in the first direction, and D is an outer periphery length of the roller.

Further features of the present invention will become apparent from the following description of exemplary embodiments with reference to the attached drawings.

DESCRIPTION OF THE EMBODIMENTS

Figure 1:
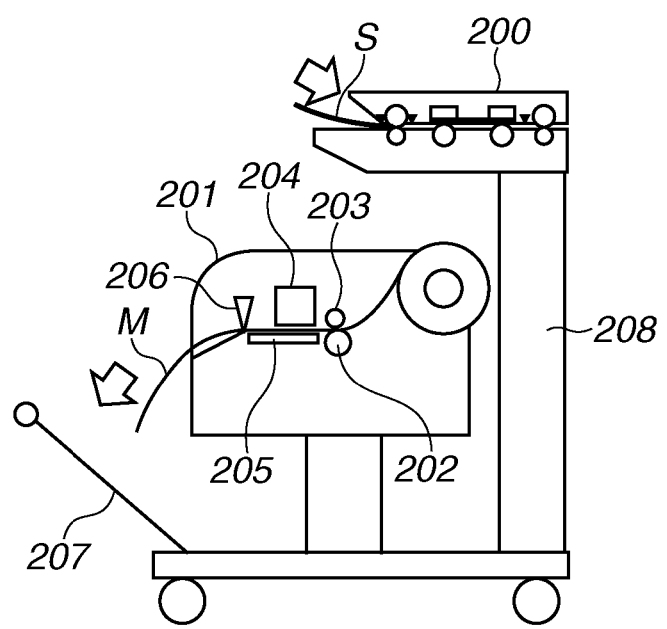
FIG. 1 is a diagram illustrating an overall configuration of an image forming apparatus according to an exemplary embodiment.

FIG. 1 is a diagram illustrating an overall configuration of an image forming apparatus according to an exemplary embodiment of the present invention. This apparatus includes as two main parts an image reading unit 200 (image reading apparatus) and an image forming unit 201. The image reading unit 200 is a scanner for reading a sheet-like document. The image forming unit 201 prints an image on a recording sheet based on image data read or sent from a host device. The image reading unit 200 is mounted in the upper portion of the image forming unit 201 using a stand 208.

The user inserts a document S into the image reading unit 200 from the arrow direction illustrated in FIG. 1. The image reading unit 200 feeds back the document S, which has been read, in the direction opposite to the arrow direction and discharges the document S to the front side of the apparatus. The image reading unit 200 may also discharge the document S to the rear side of the stand 208.

The image forming unit 201 includes a printing unit 204 for printing an image on a recording medium by using an inkjet method. The printing unit 204 includes a carriage and a recording head. The carriage reciprocates in the direction perpendicular to the conveyance direction of a recording medium. The recording head, mounted on the carriage, ejects ink of a plurality of colors. The printing method is not limited to an inkjet method but may be any of various methods including an electrophotographic method and a thermal method.

A rolled recording medium is rotatably held. This recording medium is nipped between a conveyance roller 202 and a conveyance pinch roller 203 and is conveyed in the arrow direction. A platen 205 is provided below the printing unit 204 and, on this platen 205, the printing unit 204 prints data on a recording medium M. When an area on the recording medium M where data is printed is sent to the downstream side of a cutter 206, the recording medium M including that area is cut by the cutter 206 and is discharged to a discharge unit 207.

Figure 2:
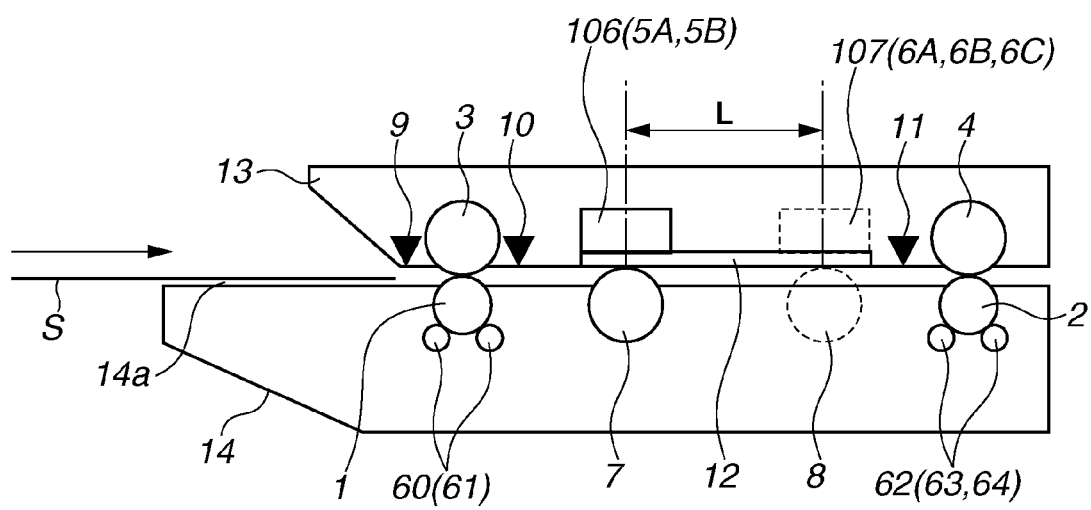
FIG. 2 is a cross section diagram illustrating a configuration of an image reading apparatus.

FIG. 2 is a cross section diagram illustrating a configuration of the image reading unit 200 illustrated in FIG. 1. The image reading unit 200 includes an upper unit 13 and a lower unit 14 that can be opened or closed. The conveyance unit conveys a document S along a path formed between these units. The user inserts a document S via a document guide surface 14*a* of the lower unit 14 with the reading face upward. The inserted document is sent to the downstream at a predetermined speed by an upstream-side conveyance roller pair, composed of a first roller 1 and a pinch roller 3, and a downstream-side conveyance roller pair composed of a second roller 2 and a pinch roller 4. The pinch roller 3 (first pressing unit) and the pinch roller 4 (second pressing unit), attached on the upper unit 13, are rotatably driven while being pushed onto the side of the first roller 1 or the second roller 2 using an urging mechanism such as a spring. Although the pressing force of the pinch roller 3 and that of the pinch roller 4 are the same in this example, the pressing force of the pinch roller 4 may be smaller than that of the pinch roller 3. This configuration reduces the impact when the leading edge of the document S enters the nip between the second roller 2 and the pinch roller 4. Support rollers 60 (first rotating member) and 61, each of which includes two rollers, are provided immediately below the first roller 1. Similarly, support rollers 62 (second rotating member), 63 (third rotating member), and 64, each of which includes two rollers, are provided immediately below the second roller 2.

A reading unit, which reads an image on the surface of a conveyed document S, is provided between the upstream-side conveyance roller pair and the downstream-side conveyance roller pair. The reading unit includes a first line sensor array 106, a second line sensor array 107, and a contact glass 12, which are provided in the upper unit 13. A rear roller 7 is provided in the lower unit 14 at a position opposing to the first line sensor array 106, and a rear roller 8 at a position opposing to the second line sensor array 107. Each of the rear roller 7 and the rear roller 8 is rotatably driven while pushing the conveyed document S onto the contact glass 12 by an urging mechanism such as a spring. At the same time, each rear roller, which contacts the back surface of the document, is used as the color reference for image reading. Therefore, the surface of the rear roller 7 and the rear roller 8 has a reference color.

In the upper unit 13, a first document sensor 9, a second document sensor 10, and a third document sensor 11 are provided along the document conveyance direction. Each sensor detects the leading edge or the trailing edge of a conveyed document, and provides information about the document passage time. The image reading unit 200 controls document conveyance and reading based on the information provided by these sensors.

Figure 3:
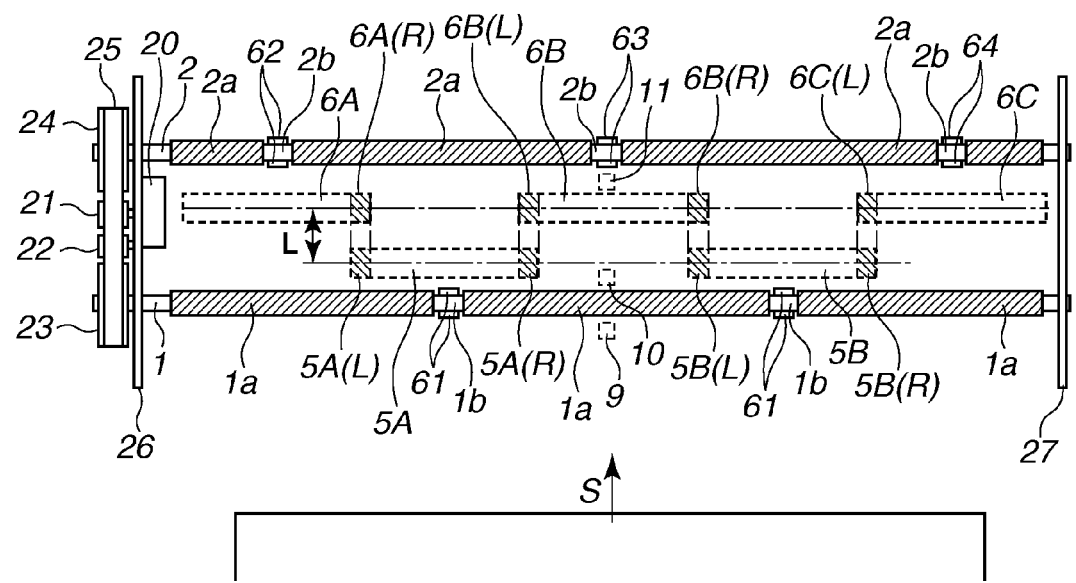
FIG. 3 is a top view illustrating a configuration of a reading unit.

FIG. 3 is a top view from above the image reading unit 200. A document to be read is sent in the direction of the arrow S. The first roller 1 and the second roller 2 are supported rotatably between a side plate 26 and a side plate 27 via bearings. The outer circumferential surfaces of the first roller 1 and the second roller 2, which contact the document S, are coated parts 1*a* and 2*a*, respectively. Each coated part is composed of a 20-μm-thick coating of urethane, ceramic, or thin-film rubber. A transmission pulley 23 is press-fixed to the first roller 1, and a transmission pulley 24 is press-fixed to the second roller 2, so that they are rotated integrally. A conveyance motor 20, composed of a stepping motor or a direct current (DC) motor, is fixed on the side plate 26 as the driving source of the conveyance unit. A conveyance motor pulley 21 is press-fixed to the conveyance motor 20, and the rotation driving of the conveyance motor 20 is transmitted to the first roller 1 and the second roller 2 via a transmission belt 25. A tension pulley 22 is rotatably installed on the side plate 26 at a position at which proper tension is applied to the transmission belt 25.

The arrangement of the line sensors of the reading unit is described below. The sub-scan direction in which a document is conveyed is called a first direction, while the main scan direction intersecting with (or perpendicular to) the first direction is called a second direction. On the upstream side in the document conveyance direction, the first line sensor array 106, which includes a first line sensor 5A, is arranged linearly (two line sensors 5A and 5B in this example) along the second direction at an interval. on the downstream side of the first line sensor array 106, the second line sensor array 107, which includes a second line sensor 6A, is arranged linearly (three line sensors 6A, 6B, and 6C in this example) along the second direction at an interval. The first line sensor array 106 and the second line sensor array 107 are arranged alternately along the second direction in a staggered pattern. The neighboring line sensors (for example, first line sensor 5A and second line sensor 6A) have an overlapped area in their reading ranges in the second direction. This overlapped area in the reading ranges is a joint portion between the neighboring line sensors (first line sensor 5A and second line sensor 6A in this example). The joint portion here refers to a portion where the two line sensors are not physically connected but the image data acquired by the two line sensors is to be connected. Similarly, the other neighboring line sensors have an overlapped area in their reading ranges in the second direction.

These line sensors are line-type image sensor units known as a contact image sensor (CIS). Each sensor unit includes a light emitting unit, which illuminates a document linearly, and a light receiving unit that includes a light receiving element array for imaging an illuminated area. An analog signal, output from the light receiving unit, is converted from analog to digital (A/D) and, if necessary, signal processing is performed for the A/D converted signal for acquiring image data in a digital signal form.

Figure 4A:
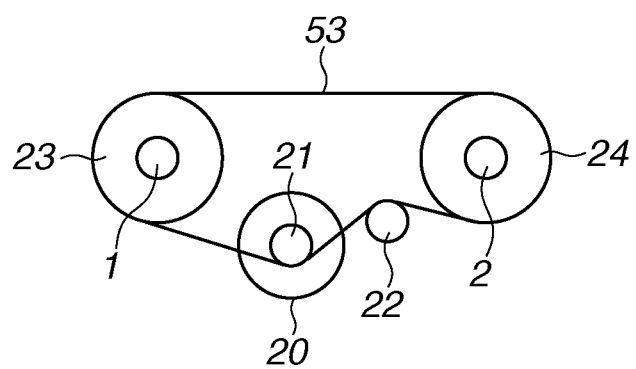
FIGS. 4A and 4B are diagrams illustrating a connection unit for driving conveyance rollers.
Figure 4B:
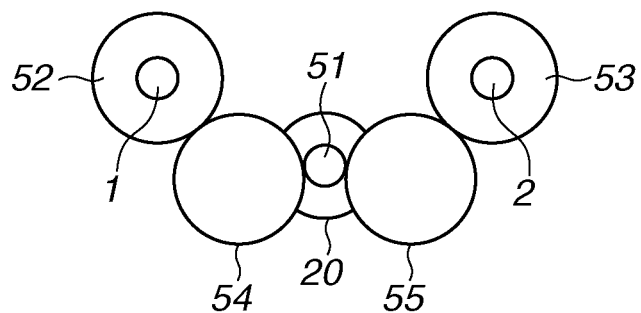

FIGS. 4A and 4B illustrate a configuration of a connection unit for driving two conveyance rollers. FIG. 4A illustrates an example of a configuration of driving force transmission by means of a belt. In this example, the conveyance motor pulley 21 has 24 teeth, each of the transmission pulleys 23 and 24 has 96 teeth, and the outer periphery length of the tension pulley 22 is equal to the pitch circle diameter of the conveyance motor pulley 21. When the first roller 1 and the second roller 2 are rotated once, the conveyance motor pulley 21 and the tension pulley 22 are rotated an integral number of times. Even if there is an eccentricity deviation in the conveyance motor pulley 21 and the tension pulley 22, this configuration reduces an error in a joint portion in a read-image, produced by combining the output of the first line sensor 5A and the second line sensor 6A, to negligible levels. That is, because the allowable range of eccentricity accuracy in the conveyance motor pulley 21 and the tension pulley 22 is increased, the parts may be manufactured at low costs.

FIG. 4B illustrates an example of a configuration of driving force transmission by means of gears. In this example, a conveyance motor gear 51 has 24 teeth, each of the transmission gears 52 and 53 has 96 teeth, and each of the idler gears 54 and 55 has 96 teeth. When the first roller 1 and the second roller 2 are rotated once, the conveyance motor gear 51 is rotated an integral number of times, and the idler gears 54 and 55 are also rotated once. Although the numbers of teeth of the transmission gears 52 and 53 are equal to the numbers of teeth of the idler gears 54 and 55, respectively. However, these gears may have the numbers of teeth so that, when transmission gears 52 and 53 are rotated once, the idler gears 54 and 55 are rotated an integral number of times.

Next, a relation between the diameters of the first roller 1 and the second roller 2 and the distance L between the first line sensor array 106 and the second line sensor array 107 in the sub scan direction (first direction), will be described. This relation is one of the features of this exemplary embodiment.

In this example, each of the diameter of the coated part 1*a* of the first roller 1 and the diameter of the coated part 2*a* of the second roller 2 is φ10 mm with the manufacturing tolerance being ±0.1 mm (1% of diameter). The outer periphery length of the roller is 31.4 mm±0.314 mm (1% of outer periphery length). Because the coating is as thin as 20 µm as described above, an irregularity in thickness, if any, is well within the range of tolerance. This tolerance makes it easy to manufacture a coated roller at low costs.

On the other hand, the distance L between the first line sensor array 106 and the second line sensor array 107 in the sub scan direction (first direction) is 31.4 mm. More strictly, the reference point of the dimension of the distance L is the center of a narrow reading range of the light receiving element of a line sensor in the sub scan direction. The manufacturing tolerance in the sensor arrangement with respect to the distance L is assumed to be ±0.9 mm (3% of distance L). This tolerance eliminates the need for the adjustment of the positions of parts that is performed using expensive adjustment jig and, at the same time, allows the parts to be manufactured at low costs. Experiments and experiences indicate that an error in the document conveyance amount is about ±1% of the theoretical value according to the type of a document or the usage environment.

By determining the dimension considering the three error components described above, the error in the distance L between the first line sensor array 106 and the second line sensor array 107, which may be generated when the first roller 1 and the second roller 2 are rotated once, is at most ±5% (=1%+3%+1%).

The mathematical expression of the above relation is represented by expression (1) given below.

$$0.95 \leq L/D \leq 1.05 \tag{1}$$

where L is the distance between the first line sensor array 106 and the second line sensor array 107 in the sub scan direction (first direction), and D is the conveyance distance corresponding to one rotation of the first roller 1 and the second roller 2.

Satisfying relation represented by expression (1) described above ensures high-accuracy image reading even if the first roller 1 or the second roller 2 is eccentric. This is because the conveyance amount of one rotation of the rollers matches the distance L and, therefore, the effect of eccentricity is canceled. As a result, even if there is a phase-dependent conveyance variation during one rotation due to a roller eccentricity, the document conveyance amount from the read position of the first line sensor array 106 to the read position of the second line sensor array 107 is not varied and is always constant. Similarly, even if there is an eccentricity in the transmission pulley (FIG. 4A) or the intermediate gear (FIG. 4B) that is the driving system of the rollers, the effect is canceled. As a result, maintaining this relation reduces an error generated in a joint portion of a read-image produced by combining the first line sensor array 106 and the second line sensor array 107, thus allowing the image to be read accurately. In addition, a reduction in accuracy required for the rollers and the driving system for document conveyance contributes to a reduction in the apparatus cost.

The effect described above may also be achieved if the distance L is set equal to the conveyance distance corresponding to an integral number of rotations (n rotations where n>1) of the first roller 1 and the second roller 2. However, if the distance L is too large, the document conveyance error in that distance becomes large and the reading unit size becomes large wastefully. Therefore, the smaller the value of n is, the higher the accuracy is. "n=1" is best with the upper limit preferably being "n=5". Considering this condition, expression (1) given above is generalized as follows.

$$0.95 \leq L/(n \times D) \leq 1.05 \ (n=\text{integer from 1 to 5}) \tag{2}$$

When the first line sensor array 106 and the second line sensor array 107 are mounted in the upper unit 13, their positions are determined based on the reading range overlapped areas 5A(L), 5A(R), 5B(L), and 5B(R) in the first line sensor array 106 and the reading range overlapped areas 6A(R), 6B(L), 6B(R), and 6C(L) in the second line sensor array 107. A positional deviation in a joint portion is especially noticeable to the user when such a positional deviation is produced, degradation in image quality is prominent. Minimizing an error in the distance L in an overlapped area minimizes a positional deviation in a joint portion. In the presents exemplary embodiment, the first line sensor array 106 and the second line sensor array 107 are arranged in such a way that expression (2) given above is satisfied in reading range overlapped areas.

Next, the support rollers (support unit) that are one of the features of the present exemplary embodiment, will be described. As illustrated in FIG. 2, support rollers 60 (first rotating member) and 61, each of includes two rollers, are provided for the first roller 1 and are attached rotatably to the lower unit 14 to prevent the roller rotation axis from being sagged by the pressing force of the pinch roller 3. Similarly, support rollers 62 (second rotating member), 63 (third rotating member), and 64, each of which includes two rollers, are provided for the second roller 2.

As illustrated in FIG. 3, positions 1*b*, where support rollers 60 and 61 contact the first roller 1, and positions 2*b*, where support rollers 62, 63, and 64 contact the second roller 2, are non-coated parts where the rollers are not coated. There are two fulcrum positions of the support rollers 60 and 61 that abut on the first roller 1, each around the center of the two first line sensors 5A and 5B respectively in the main scan direction (second direction). Similarly, there are three fulcrum positions of the support rollers 62, 63, and 64 that abut on the second roller 2, each located approximately at the center of the three second line sensors 6A, 6B, and 6C respectively in the main scan direction (second direction). In this manner, the fulcrums of the support units are arranged in a staggered pattern according to the staggered pattern of the line sensors.

The support units are arranged in this manner for the following reason. To simply prevent the roller rotation axis from being sagged, the more fulcrums of support units, the better. However, as more fulcrums of support units are present, a sliding load on the first roller 1 and the second roller 2 is increased. This increased load generates conveyance variations. As the roller becomes longer, a difference in the conveyance amount between the left of the roller and the right of the roller, which is caused by a twist in the rotation axis, becomes so large that cannot be neglected. In addition, an increase in the sliding load requires the use of a large-torque motor. As the document format becomes larger, these problems become more prominent. To solve these problems, the fulcrums of the support units are arranged in the positions where the impact of a sag in the rotation axis can be prevented effectively, that is, the fulcrums of the support units are arranged in the centers of the line sensors in a staggered pattern. This arrangement satisfies the two conflicting requirements, the prevention of sag and the prevention of an increase in the driving load, at a high level.

If support rollers are eccentric, the first roller 1 and the second roller 2, which are in contact with the support rollers, are displaced upward or downward or displaced into the sub scan direction (first direction) as the support rollers are rotated. This displacement sometimes causes a document conveyance error. To cancel the influence of this eccentricity, the support rollers 60, 61, 62, 63, and 64 are to be rotated an integral number of times (one or more times) when the first roller 1 and the second roller 2 are rotated once. This relation is expressed in a mathematical form using expression (3) given below.

$$0.98 \leq P/(m \times Q) \leq 1.02 \text{ (}m\text{=integer equal to or larger than 1)} \quad (3)$$

where P is the outer periphery length of a roller arranged at a position where the rotating member of the support unit, which prevents the roller from being sagged, abuts on the roller and Q is the outer periphery length of the rotating member.

To satisfy expression (3), the diameter of the roller at the positions 1b and 2b, which are the fulcrums of the first roller 1 and the second roller 2, is set in this example to φ9.96 mm with the manufacturing tolerance of ±0.1 mm (1% of diameter). The diameter of the support rollers 60, 61, 62, 63, and 64 is set to φ4.98 mm with the manufacturing tolerance of ±0.05 mm (1% of diameter). As a result, when the first roller 1 and the second roller 2 are rotated once, the support rollers 60, 61, 62, 63, and 64 are rotated twice.

It should be noted that the present invention is not limited to the configuration of the present exemplary embodiment described above, and includes various modifications. For example, the outer periphery length of the second roller 2 may be slightly longer than that of the first roller 1. With this configuration, the second roller on the downstream side pulls the document S. This eliminates a slack of a document in the areas immediately below the first line sensor 5A and the second line sensor 6A, thus ensuring more reliable reading. In this case, the nip pressure, with which a document is nipped, is set in such a way that the first roller 1 on the upstream side should have a higher nip pressure to control the conveyance amount to on the upstream side. In addition, the first roller 1 on the upstream side, which has ability to perform control, should at least satisfy the relations (1) to (3) described above.

Figure 5:
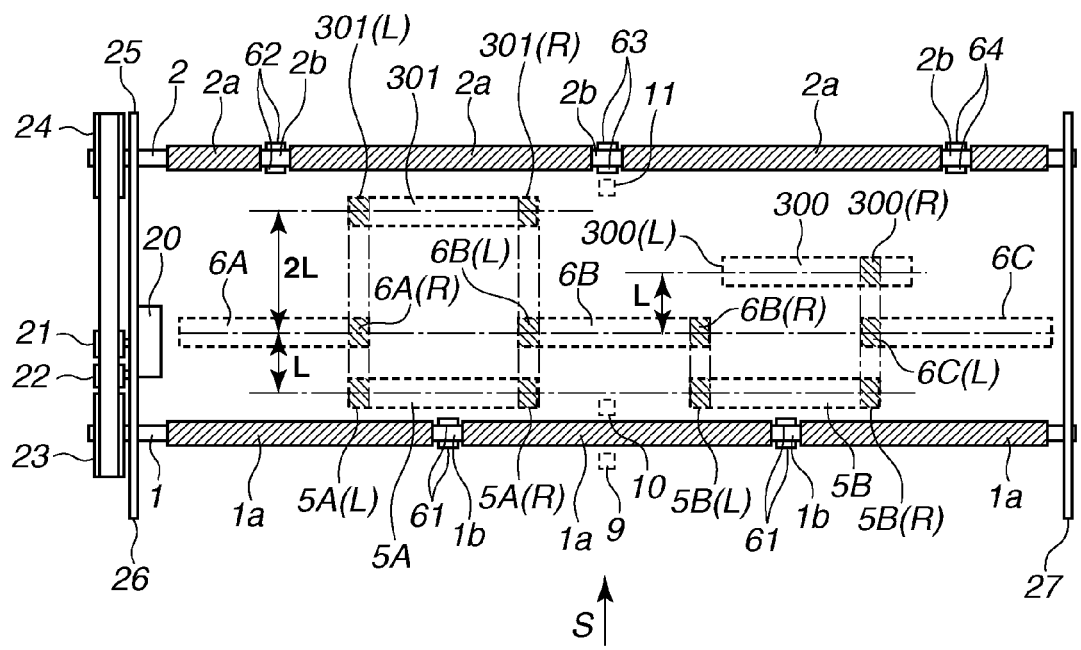
FIG. 5 is a diagram illustrating a modification of the reading unit illustrated in FIG. 3.

In the present exemplary embodiment described above, the reading unit has a configuration in which a plurality of line sensors, which includes the first line sensor 5A and the second line sensor 6A arranged apart in the first direction, is regularly arranged along the second direction that intersects with the first direction. The line sensors need not be arranged alternately in a staggered pattern as long as they are arranged regularly. For example, the line sensors may be arranged as illustrated in FIG. 5. In the example illustrated in FIG. 5, a third line sensor 300 and a fourth line sensor 301 are arranged in the sub scan direction (first direction) with a certain distance. As described above, this distance may be set to an integral multiple of the distance L. In this example, the distance between the third line sensor 300 and the fourth line sensor 301 is set to L. In the present exemplary embodiment described above, though the first line sensor array 106 and the second line sensor array 107 are arranged in a staggered pattern in such a way that the line sensors partially overlap, there may be a non-overlapped read area as illustrated in a non-overlapped area 300(L) in FIG. 5.

Figure 6:
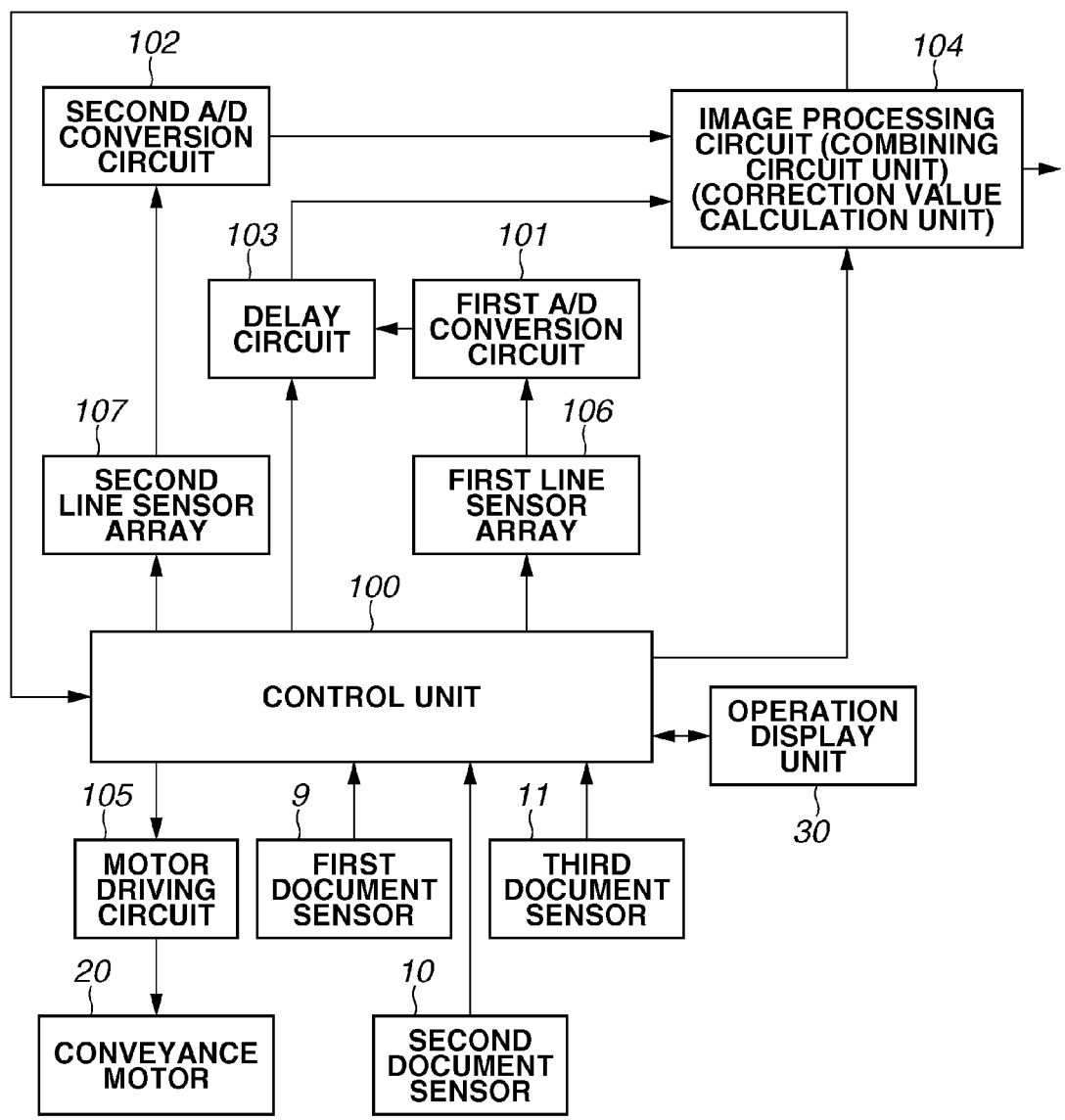
FIG. 6 is a block diagram illustrating a system of the image reading apparatus.

Next, the present exemplary embodiment is described from the viewpoint of the control system and the operation sequence. FIG. 6 is a system block diagram of the image reading apparatus in the present exemplary embodiment. A control unit 100 includes a central processing unit (CPU), memories (e.g., read only memory (ROM), random access memory (RAM), nonvolatile memory), an input/output (I/O) unit, and an interface unit. The control unit 100 receives a mode setting signal from an operation display unit 30, and a detection signal from the first document sensor 9, the second document sensor 10, and the third document sensor 11. The control unit 100 controls a delay circuit 103 and an image processing circuit 104 and, via a motor driving circuit 105, the start of the conveyance motor 20.

First and second A/D conversion circuits 101 and 102 convert an analog signal, output from each of the first line sensor array 106 and the second line sensor array 107, to a digital signal. The first line sensor array 106 and the second line sensor array 107 include light receiving elements arranged at 2400 dots per inch (dpi) in the main scan direction. Each of the colors (red, green, and blue (RGB)) can be represented by an 8-bit digital image signal (256 gradations) on a pixel basis. The delay circuit 103 is provided only for the first A/D conversion circuit 101. The delay circuit 103 is used to correct an image deviation caused due to a distance (corresponding to the distance L illustrated in FIG. 2 or FIG. 3) in the sub scan direction (first direction) of the first line sensor array 106 and the second line sensor array 107. For each line that is read, the delay circuit 103 temporarily stores an image signal in the memory of the delay circuit 103 to delay it by a pre-set delay time.

The image processing circuit 104 includes a combination circuit unit. The combination circuit unit combines a digital image signal, received from the delay circuit 103, with a digital image signal, received from the Second A/D conversion circuit 102, on a line basis. The image processing circuit 104 generates digital image data from one line digital image signal, acquired sequentially by the combination circuit unit, and acquires the whole image of a document.

Figure 7:
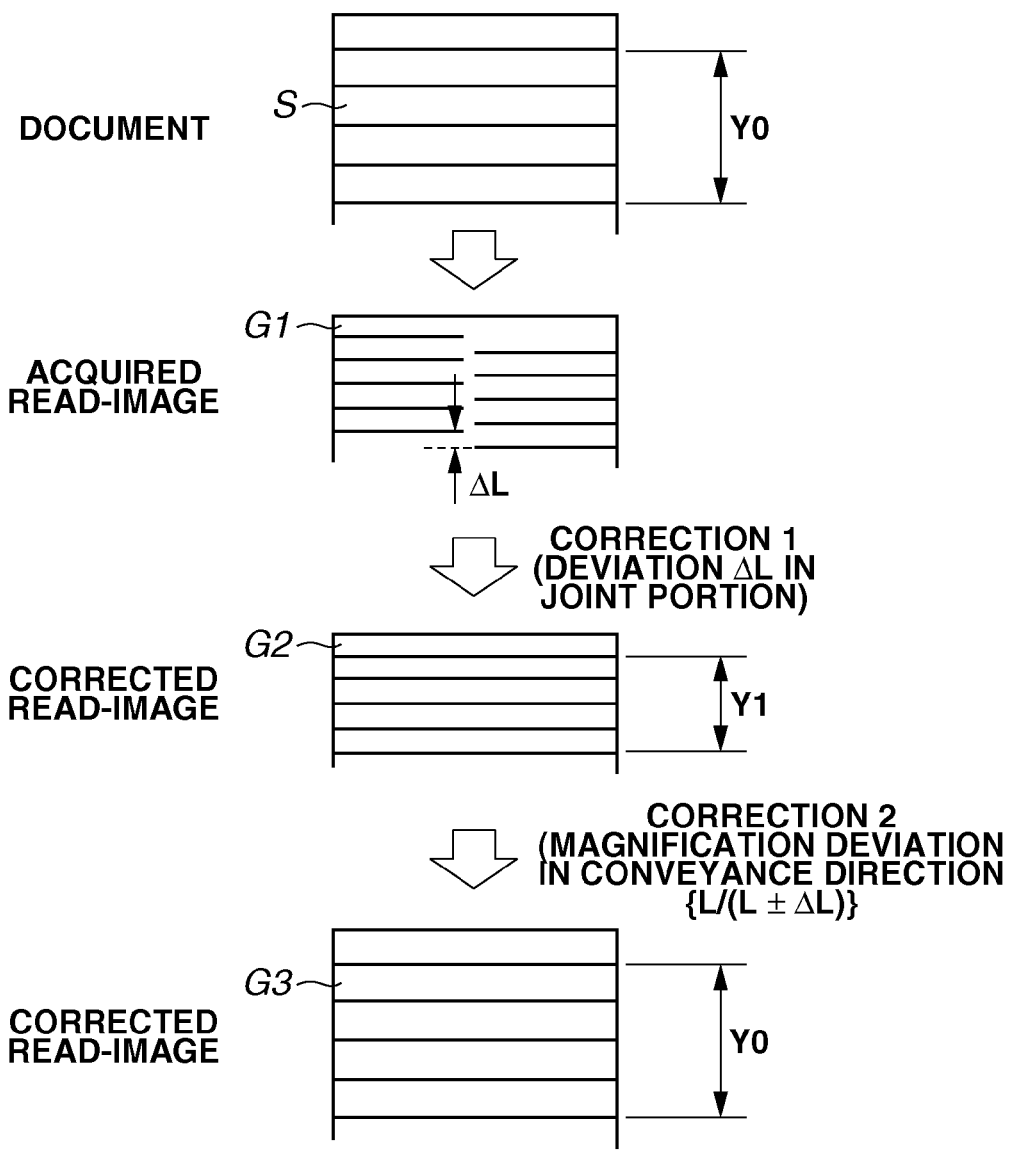
FIG. 7 is a diagram illustrating an example in which corrected image data is output.
Figure 8:
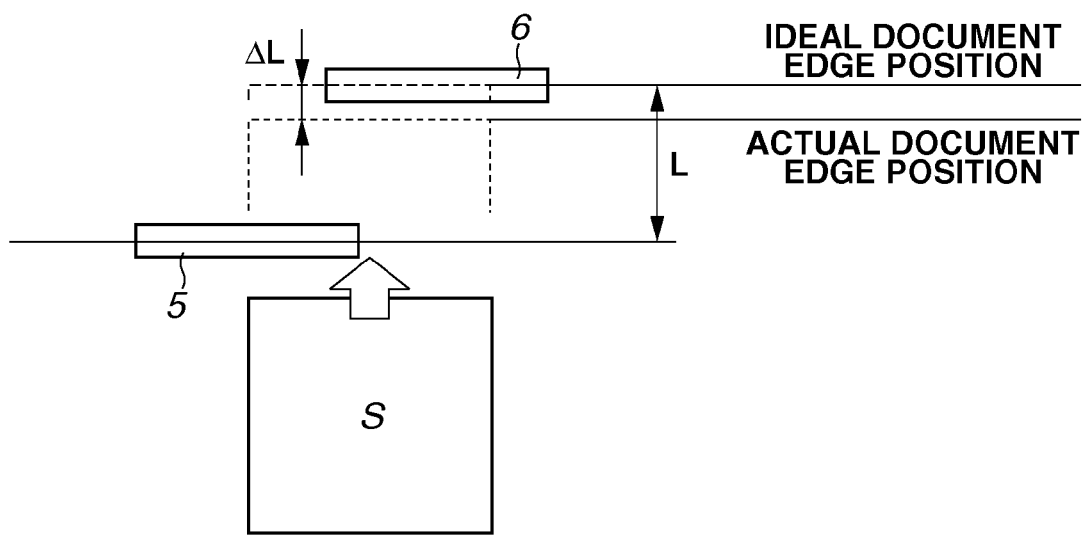
FIG. 8 is a diagram illustrating a deviation between an ideal conveyance position and an actual conveyance position of a document.

The image processing circuit 104 further includes a correction value calculation unit. The correction value calculation unit acquires an image deviation amount ΔL based on the image data acquired from the first line sensor array 106 and the second line sensor array 107. ΔL means an image deviation amount generated in a read-image G1, read by the two sensors, due to a deviation in the read time between the sensors as illustrated in FIG. 7. This deviation is caused primarily by a conveyance variation generated when the document S is read. For example, when the document edge position, actually read and acquired at a predetermined time, is positioned on the upstream side of the ideal document edge position in the sub scan direction as illustrated in FIG. 8, an image deviation of ΔL is generated.

The correction value calculation unit calculates a correction value based on the acquired ΔL. The calculated correction value is fed back to the image processing circuit 104 and the control unit 100. A method for acquiring ΔL and a method for calculating a correction value will be described below.

Before reading a document, the apparatus in the present exemplary embodiment uses a part of the document, from which an image is to be actually read, to acquire information for correcting document reading (this sequence is called "preliminary operation"). After this preliminary operation, the apparatus once feeds back the document and, then, starts actual document reading (this is called "main scan"). In the preliminary operation, the apparatus detects the edges of a document using the first line sensor and the second line sensor to acquire information for correcting document reading.

Figure 9:
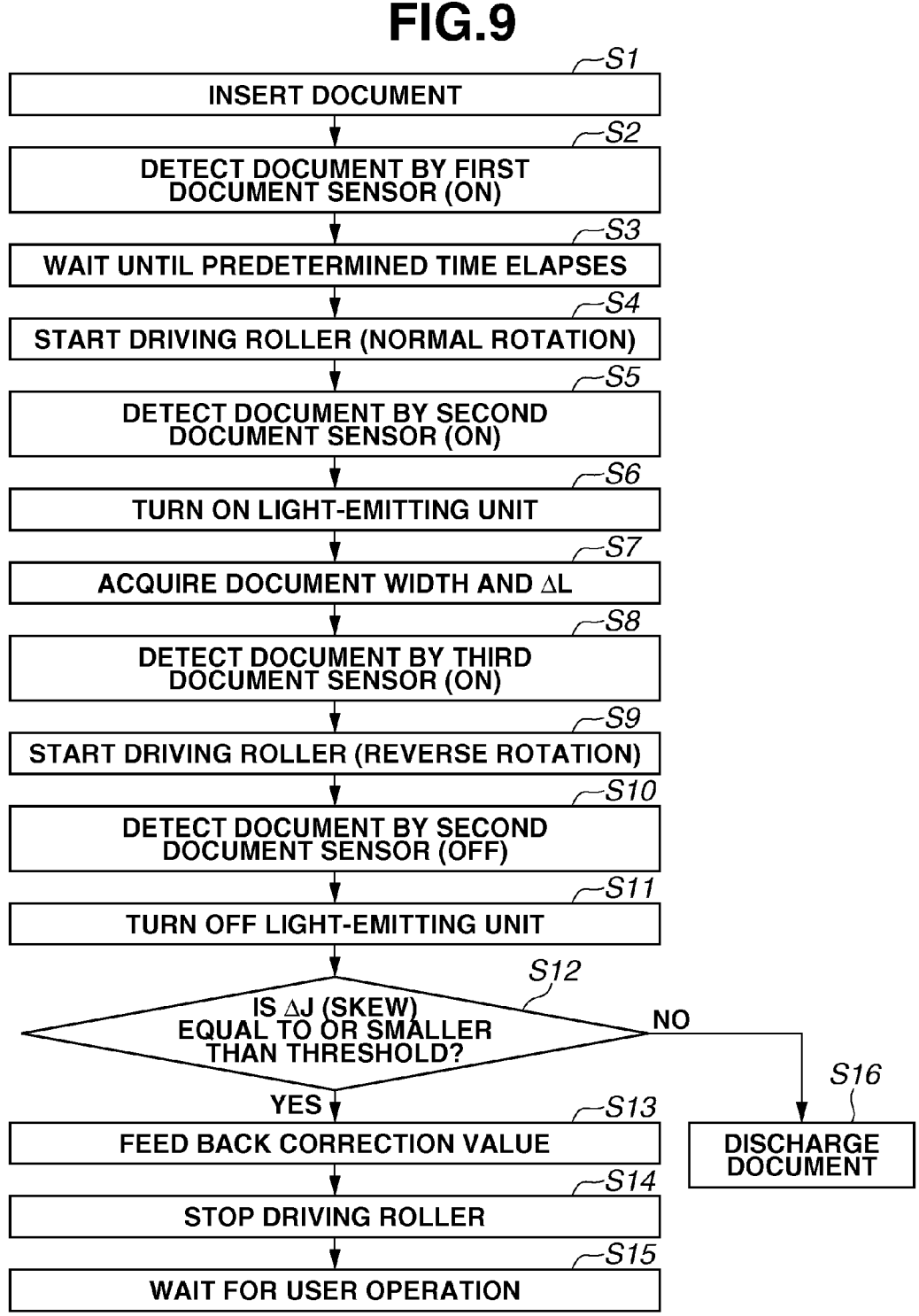
FIG. 9 is a flowchart illustrating an operation procedure for a preliminary operation.

The flowchart in FIG. 9 illustrates the sequence of the preliminary operation. In step S1, the user places a document S on the document guide surface 14a to insert it into the path in the downstream direction. In step S2, the first document sensor 9 detects the leading edge of the inserted document S and becomes ON. In step S3, the apparatus waits for a predetermined time until the leading edge of the document reaches the nip line of the first roller 1 and the pinch roller 3. In step S4, the conveyance motor 20 starts driving in the normal direction to cause the first roller 1 and the second roller 2 to rotate to start feeding the document. In step S5, the second document sensor 10 detects the leading edge of the conveyed document and becomes ON.

In step S6, the light emitting unit of the line sensor is turned on to start reading the document. This reading is not final image reading but is only an operation for acquiring information, such as correction values, in advance before the main scan is performed. During reading, the first line sensor 5A and the second line sensor 6A read a part near the leading edge of the document in a position where the document is between the contact glass 12 and the rear roller 7, and between the contact glass 12 and the rear roller 8.

In step S7, the apparatus acquires information about the document width in the main scan direction and about $\Delta L$ from the image that has been read. To obtain the document width, the apparatus analyzes the image data, which is read and analyzed in step S6, to determine the signal levels in the main scan direction. More specifically, the apparatus determines the addresses of the two light receiving elements where the color, lightness, and reflectance change. The distance between these two addresses is the document width.

In step S8, the third document sensor 11 detects the leading edge of the document S and becomes ON. This means that the document feeding for the preliminary operation is ended. In step S9, the apparatus reversely drives the conveyance motor 20 to cause the first roller 1 and the second roller 2 to rotate in the opposite direction until now to once feed back the document. In step S10, the second document sensor 10 becomes OFF. In step S11, the light emitting unit of the line sensor becomes OFF.

In step S12, the apparatus calculates the tilt $\Delta J$ of the document based on a plurality of values of $\Delta L$, and determines whether the $\Delta J$ is equal to or smaller than the threshold. $\Delta J$ is a parameter indicating the amount of oblique tilt during the conveyance, that is, a parameter indicating how much the document has skewed. If the acquired skew is too large, the document tilt increases as the document is conveyed. If the right and left edges of the document strongly come into contact with the guide members, there is a possibility that the document is folded and damaged. The specific method for acquiring $\Delta J$ will be described below.

If $\Delta J$ is equal to or smaller than the threshold (YES in step S12), the processing proceeds to step S13. In step S13, the apparatus feeds back a correction value, calculated from $\Delta L$, to the control unit 100. In step S14, the apparatus stops driving the conveyance motor 20 to stop the feedback of the document. In step S15, the apparatus waits for the user to perform an operation on the operation display unit 30 with the document nipped between the first roller 1 and the pinch roller 3. On the other hand, if the apparatus determines in step S12 that $\Delta J$ is larger than the threshold (NO in step S12), the processing proceeds to step S16. This state indicates that the tilt amount of the document is too large to read. In step S16, the apparatus once discharges the document and displays a message on the operation display unit 30 to prompt the user to set the document again.

Figure 10:
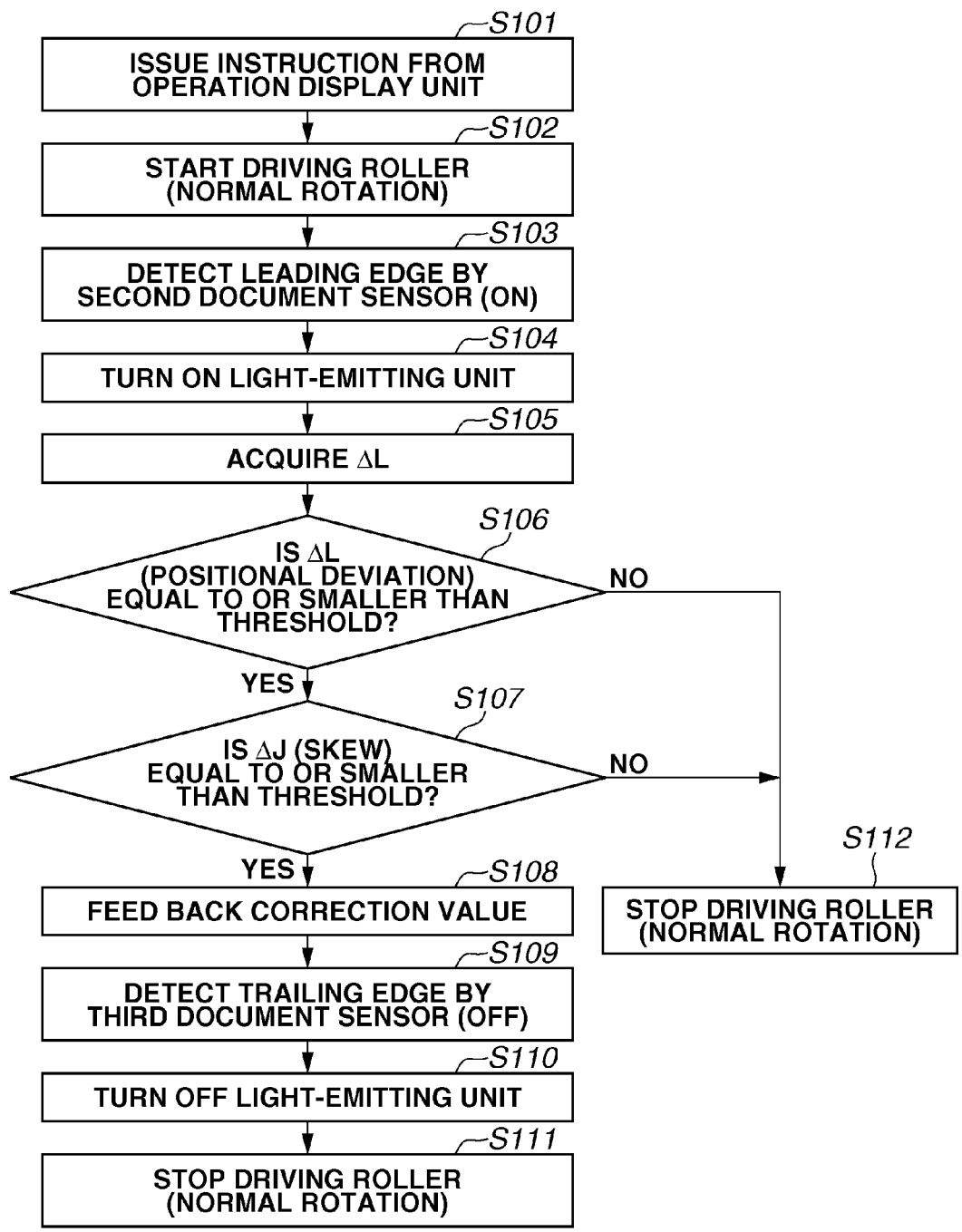
FIG. 10 is a flowchart illustrating an operation procedure for a scan operation.

The flowchart in FIG. 10 illustrates an operation sequence of "main scan" that is executed after the preliminary operation described above. When the preliminary operation described above is ended, the apparatus waits for the start of the main scan with the document nipped between the first roller 1 and the pinch roller 3.

In step S101, the user performs an operation on the operation display unit 30 to instruct the apparatus to start the main scan. In step S102, the apparatus drives the conveyance motor 20 in the normal rotation direction to cause the first roller 1 and the second roller 2 to start feeding the document. In step S103, the second document sensor 10 detects the leading edge of the document and becomes ON.

In step S104, the light emitting unit of the line sensor is turned on to read an image. Unlike in the preliminary operation described above, the apparatus actually reads an image in the main scan. The image data, which is acquired by the reading, is stored in the memory of the control unit. The apparatus continues the conveyance of the document even if the third document sensor 11 detects the leading edge of the document S and becomes ON.

In parallel with the reading of the image in step S105, the apparatus acquires information about $\Delta L$ in real time from the image data that has been read. The apparatus acquires this information to detect a conveyance jam. If $\Delta L$ is so large that it exceeds the threshold, there is a possibility that a document jam has occurred. Thus, even while the document is read, the apparatus acquires correction information using the output detected by the first line sensor and the second line sensor.

In step S106, the apparatus compares the acquired $\Delta L$ with a predetermined threshold in real time. If $\Delta L$ is equal to or smaller than the threshold (YES in step S106), the processing proceeds to step S107 assuming that no conveyance error is generated. On the other hand, if $\Delta L$ exceeds the threshold (NO in step S106), the apparatus determines that a conveyance error is generated and the processing proceeds to step S112 to immediately stop the driving of the rollers. After that, the apparatus displays an error on the operation display unit 30 and prompts the user to discharge the document.

In step S107, the apparatus calculates skew $\Delta J$ from a plurality of $\Delta L$ and compares $\Delta J$ with a predetermined threshold. If $\Delta J$ exceeds the threshold (NO in step S107), the apparatus determines that there are too much skew and the processing proceeds to step S112 to immediately stop the driving of the motors. After that, the apparatus displays an error message on the operation display unit 30 to prompt the user to discharge the document.

In step S107, if it is determined that $\Delta J$ is equal to or smaller than the threshold (YES in step S107), the processing proceeds to step S108. In step S108, the apparatus feeds back the correction value, calculated from $\Delta L$, to the control unit 100 and the image processing circuit 104. At this time, the fed back correction value may be applied either immediately to an unread image part of the document from which $\Delta L$ is acquired or to the next and the following documents. Thus, when correction information for document reading is acquired, the correction is performed on the document being read or to the next and the following documents.

Variations in document conveyance differ between the state in which a document is conveyed by a single roller and the state in which a document is conveyed by a plurality of rollers. More specifically, a document is conveyed in one of the following three states: a document is conveyed only by the first roller 1 when reading the leading edge area of the document, a document is conveyed only by the second roller 2 when reading the trailing edge area of the document, and a document is conveyed by both rollers when reading the greater part of the document except the leading edge area and the tailing edge area. Therefore, it is useful to feed back the correction value calculated from $\Delta L$ in a different way according to one of the three states.

When all areas of the document are read, the third document sensor 11 detects the trailing edge of the document S and becomes OFF in step S109. In step S110, the light emitting unit of the line sensor becomes OFF. In step S111, the apparatus stops driving the conveyance motor 20 to cause the first roller 1 and the second roller 2 to stop conveying the document. The document, which has been read, may be discharged by feeding back the document to the upstream side or by feeding the document to the downstream side according to an instruction from the user.

How the apparatus acquires ΔL and ΔJ, will be described. The apparatus acquires ΔL by using image data acquired in a joint portion between the first line sensor array 106 and the second line sensor array 107. More specifically, as illustrated in FIG. 3, image data acquired from the reading-overlapped areas is used (5A(L) and 6A(R), 5(R) and 6B(L), 5B(L) and 6B(R), and 5B(R) and 6C(L)).

The apparatus reads the leading edge of a document in the overlapped areas while conveying the document S. The correction calculation unit of the image processing circuit 104 is used to generate image data acquired from each overlapped area. When the leading edge passes over a line sensor, the signal level that is output from each light receiving element of the sensor changes either due to a difference in color, lightness, and reflectance between the document and the reverse roller or due to the shade of the leading edge. The apparatus reads the leading edge by detecting this change.

Figure 11:
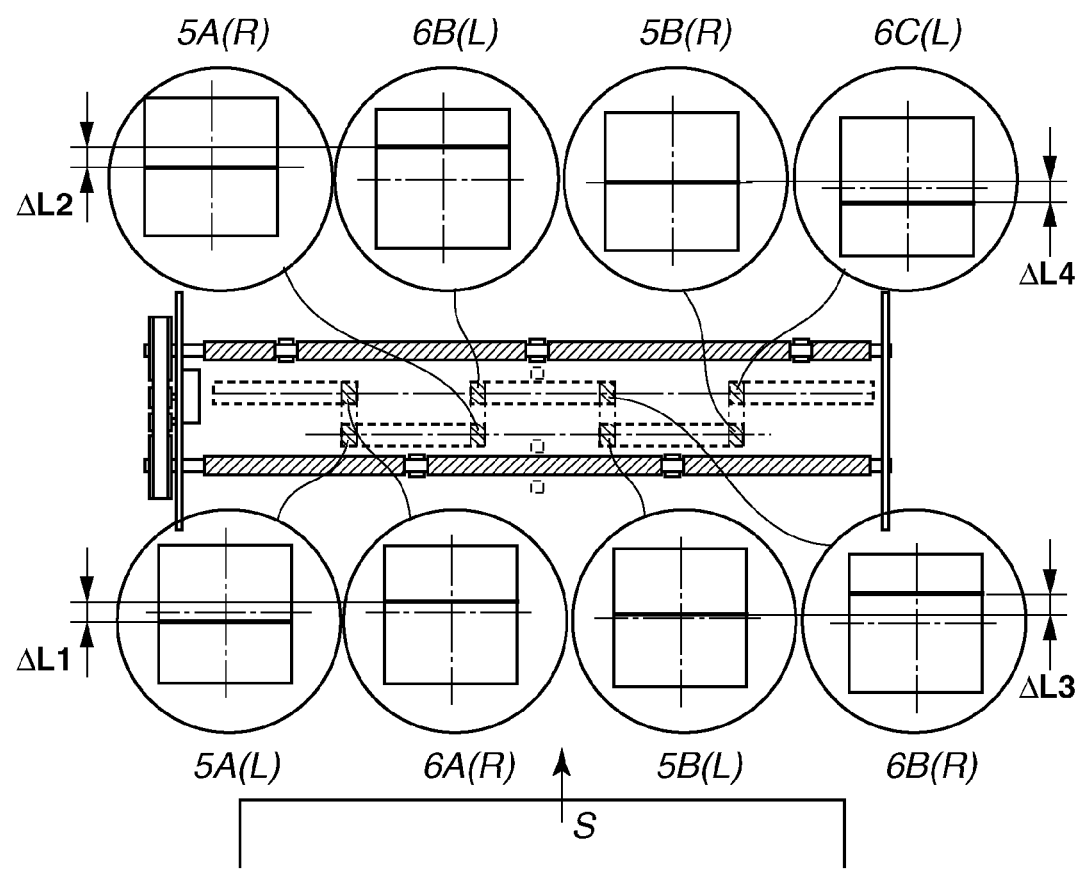
FIG. 11 is a diagram illustrating an example of image data acquired by reading a document edge part.

The apparatus acquires image data in four positions in the document width direction (second direction) as illustrated in FIG. 11. The apparatus acquires ΔL1 to ΔL4 by comparing the image data that read from the same position on the document with each other. For example, the apparatus extracts the linear pattern of a document edge (bold line in the figure) included in each of two pieces of image data acquired in the overlapped areas 5A(L) and 6A(R). The apparatus then acquires the value of ΔL by calculating the difference in the coordinates of the pattern positions in the sub scan direction (first direction). A method using an algorithm, such as image correlation and feature point extraction, is suitable for image data comparison.

ΔL1 to ΔL4 indicate conveyance variations in the positions in the document width direction. The positional deviation amount ΔL of the whole document can be acquired by calculating the average of the values of ΔL1 to ΔL4. ΔL may be acquired by selecting one of ΔL1 to ΔL4 as the representative value or by calculating the deviation. ΔL may also be acquired similarly by comparing image data with each other acquired from two positions that do not correspond to the joint portion (for example, 5A(R) and 6B(R)).

Acquisition of ΔL1 to ΔL4 in four positions is only an example for the sake of description. Actually, as the document width becomes longer, more line sensors are arranged in the document width direction. In such a case, the image deviations ΔL in four or more positions may be used. When there are a total of x joint portions of line sensors, the information about ΔL1 to ΔLx is acquired. ΔL in this case is calculated as the average value of all of ΔL1 to ΔLx or a plurality of representative values.

The skew ΔJ is calculated using some of the values of ΔL1 to ΔLx given above. More specifically, the skew ΔJ is calculated as the difference between the value of ΔLy, which is the position nearest to the left end of the document in the area of the document to be read, and the value of ΔLz which is nearest to the right end of the document. That is, ΔJ=ΔLy−ΔLz. When the size of the document to be read (document width) is changed, the relative positions of y and z may also be changed accordingly.

The tilt of the whole document can be found from the information on the two positions near both ends of the document. Whether the document is deformed can also be determined by comparing three or more positions. For example, in the case of ΔL1 to ΔL4 illustrated in FIG. 11, ΔL2 and ΔL3 in the center of the document are positioned on the downstream side in the conveyance direction as compared with ΔL1 and ΔL4 that are read from both ends of the document. Therefore, in this example, it can be determined that the central part of the document is deformed convexly toward the downstream in the conveyance direction.

In the description above, the leading edge part of a document is read. The present exemplary embodiment is not limited to reading the leading edge, and the trailing edge part of a document may also be read. In addition, after the leading edge of a document passes over the line sensors during the main scan, it is also possible to acquire a non-printed paper fiber pattern on the document surface or a partial pattern of a printed image as an image and acquire ΔL by comparing the acquired images in the same manner as described above.

Figure 12:
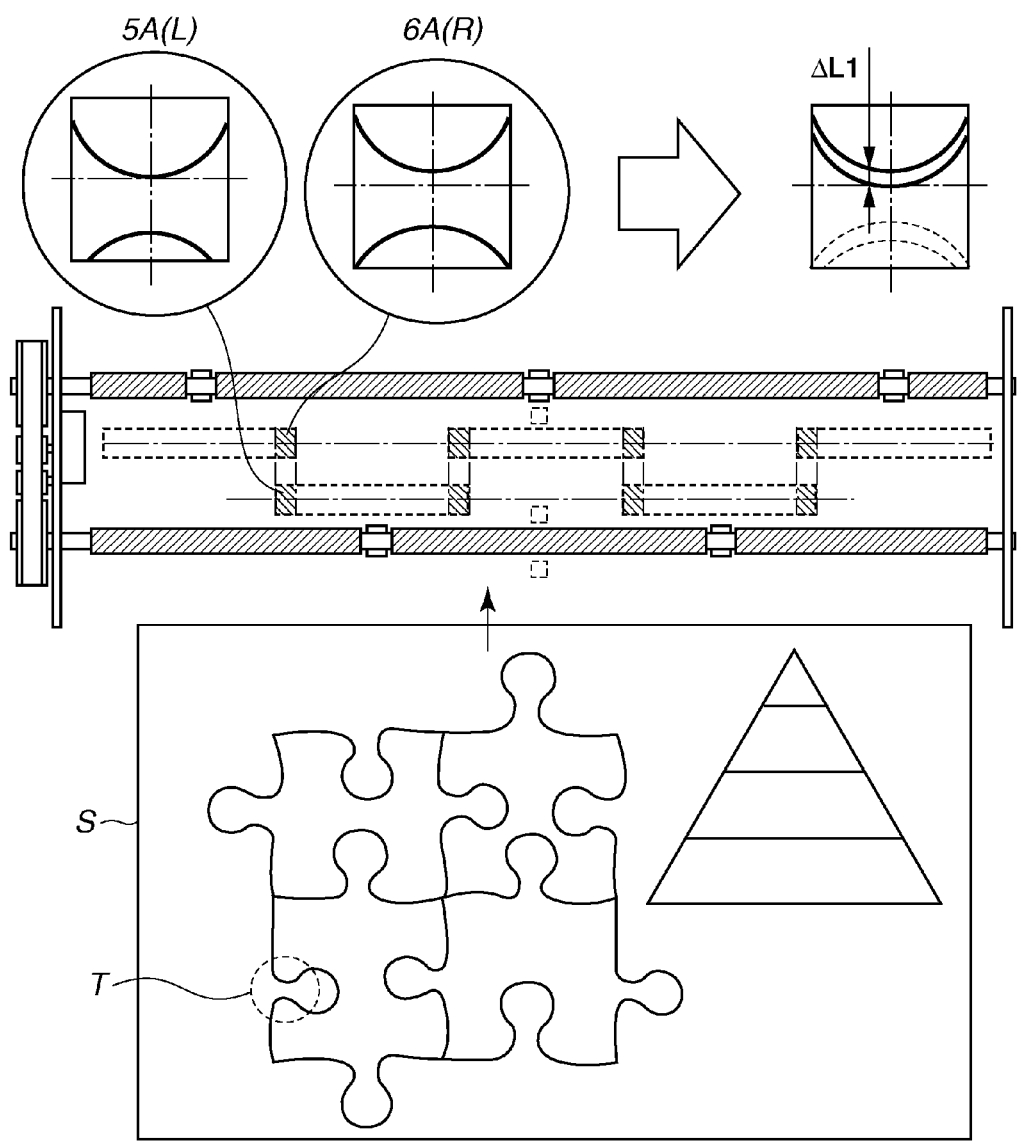
FIG. 12 is a diagram illustrating an example of image data acquired by reading a document image part.

FIG. 12 illustrates an example of a method for acquiring ΔL during the main scan. In this example, a part T of the document S is acquired using reading overlapped areas 5A(L) and 6A(R). FIG. 12 illustrates image data acquired from each area. The patterns (bold curve in the top in FIG. 12), included in each of the two pieces of acquired image data, are extracted. The coordinate difference between the pattern positions in the sub scan direction (first direction) is calculated to acquire the value of ΔL1.

Next, a method for correcting a read image using ΔL obtained by the method described above, will be described. There are two types of corrections. One is the correction of a deviation amount in a joint portion between the first line sensor array 106 and the second line sensor array 107 as illustrated in FIG. 7 (hereinbelow, this correction is referred to as "correction 1"). The other is the correction of the magnification deviation of a read image in the sub scan direction such as the one illustrated in FIG. 8 (hereinbelow, this correction is referred to as "correction 2").

The following methods are available for "correction 1". Any of the following methods may be selected.
(Method 1) Adjustment of document conveyance amount or conveyance speed
(Method 2) Relative adjustment of reading period between line sensors
(Method 3) Relative adjustment of image data between line sensors
(Method 4) Adjustment of delay time by means of delay circuit 103

(Method 1) will be described. The document conveyance amount or the conveyance speed is controlled based on the rotation control of the first roller 1 and the second roller 2 that convey a document. The rotation control is performed based on the detection of pulses (number of pulses) output from the rotary encoder provided on the roller axis. The information about ΔL acquired as described above is fed back to the control unit 100 to change the setting of the number of pulses, which will be output from the encoder within a predetermined time, by the amount equivalent to ΔL. The motor driving circuit 105 drives the motors according to the changed setting. By adjusting the document conveyance amount or the conveyance speed so that ΔL approaches zero, the deviation amount in the joint portion illustrated in FIG. 7 approaches zero. This makes the acquired image data well corrected.

In (Method 2), the acquired information about ΔL is fed back to the control unit 100 to control the reading period phase of the first line sensor array 106 and the second line sensor array 107. More specifically, the control unit 100 controls the reading period phase of the second line sensor array 107 so that the second line sensor array 107 is shifted by ΔL with respect to the first line sensor array 106. By adjusting the reading timing of the second line sensor array 107 in this way, the deviation amount in the joint portion illustrated in FIG. 7 approaches zero. This makes the acquired image data well corrected.

In (Method 3), when combining the digital image signal acquired by the first line sensor array 106 with the digital image signal acquired by the second line sensor array 107, the combination circuit unit performs the image processing considering a deviation amount in the joint portion. By shifting the digital image signal of the first line sensor array 106 by $\Delta L$, the deviation amount in the joint portion illustrated in FIG. 7 approaches zero. This makes the acquired image data well corrected.

In (Method 4), the delay circuit 103 delays the digital image signal, acquired by the first line sensor array 106, to eliminate the time difference between the digital image signal acquired by the first line sensor array 106 and the digital image signal acquired by the second line sensor array 107. The acquired information about $\Delta L$ is fed back to the control unit 100 to make the wait time of the delay circuit 103 shorter or longer by $\Delta L$ so that the deviation amount in the joint portion illustrated in FIG. 7 approaches zero. This makes the acquired image data well corrected.

After eliminating $\Delta L$ by any one of the methods of "correction 1", it is required to perform "correction 2" next. In "correction 2", the magnification of the acquired read-image in the sub scan direction is corrected by $\{L/(L\pm\Delta L)\}$.

The following methods are available for "correction 1". Any of the following methods may be selected.
(Method A) Adjustment of reading period pitch of line sensor
(Method B) Adjustment by expansion/contraction processing of image data In (Method A), the information about the acquired $\Delta L$ is fed back to the control unit 100 to control the reading period of the first line sensor array 106 and the second line sensor array 107. More specifically, the reading period pitches of both the first line sensor array 106 and the second line sensor array 107 are increased by $\{L/(L\pm\Delta L)\}$. This increase in the reading period pitch corrects the image magnification in the sub scan direction illustrated in FIG. 7, making the finally acquired image data well corrected.

In (Method B), when sequentially acquired digital image signals are arranged in the sub scan direction (first direction), one line at a time, for generating image data, the line pitch is increased by $\{L/(L\pm\Delta L)\}$. This increase in the line pitch corrects the image magnification in the sub scan direction (first direction) illustrated in FIG. 7, making the finally acquired image data well corrected.

When the reading period of the first line sensor array 106 and the second line sensor array 107 is controlled in (Method 2) and (Method A) described above, the system clock is used as a reference. It should be noted that the reading period need not always be controlled based on the system clock, and the first line sensor 5A and the second line sensor 6A may read an image based on the number of pulses output from the rotary encoder provided on the same axis as that of the first roller 1 and second roller 2. In this case, when the operation of the first roller 1 and the second roller 2 is delayed due to a sliding load of a document, the reading period of the first line sensor 5A and the second line sensor 6A is delayed accordingly. Therefore, the deviation amount of $\Delta L$ becomes smaller in this case.

In the example described above, a document is conveyed by the first roller 1 and the second roller 2 at a predetermined speed. The present exemplary embodiment may also be applied to the intermittent feed operation that is performed repeatedly in such a way that, each time one line is read, the operation is stopped and then a document is fed a predetermined feed amount.

In the example of the configuration in this specification, a document is conveyed toward the fixed reading unit for reading from the document. The present exemplary embodiment is not limited to this configuration. Another configuration is also possible in which, while a document is conveyed in the first direction, the reading unit is moved also in the first direction as the document is conveyed. In this case, the reading unit can be moved at an optimum speed at which the line sensor reads an image while maintaining the document conveyance speed at which the amount of conveyance variations is minimized. This method increases the reading accuracy of line sensors while reducing conveyance variations. In this manner, to move the reading unit and a document relatively, one of the two configurations may be employed in which one of them is moved and in which both are moved.

The exemplary embodiment described above achieves the following great effects.
(1) By making the distance between the first line sensor and the second line sensor approximately equal to the outer periphery lengths of the rollers that convey a document, the document can be read accurately even if the conveyance roller becomes longer as the document format becomes larger. In other words, an image can be read accurately without having to increase the machining accuracy of conveyance rollers. In addition, an improvement in the configuration of the peripheral components of the conveyance rollers allows an image to be read more accurately.
(2) Before reading a document, correction information about document reading is acquired using a part of the document from which an image is to be actually read. This correction information eliminates the need for preparing a special adjustment sheet. Therefore, the user needs only to prepare a document to be read, and finds it more convenient.
(3) The line sensors, originally used for document reading, are used also to acquire information about the conveyance state such as a document conveyance amount, a conveyance speed, a document tilt, and a document deformation. Using this information enables more accurate image reading in the main scan. In particular, though a larger-format document size (document width) tends to make the document conveyance unstable, the line sensors can be used to acquire information in a plurality of positions. This eliminates the need for providing many special-purpose speed sensors, making it possible to read an image accurately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-107470 filed May 21, 2013, which is hereby incorporated by reference herein in its entirety.

What is claimed is:
1. An image reading apparatus comprising:
a reading unit having a configuration in which a plurality of line sensors, including a first line sensor and a second line sensor arranged apart in a first direction, are regularly arranged along a second direction intersecting with the first direction; and
a unit configured to move a document relative to the reading unit in a first direction using a roller,
wherein a relation of $0.95 < L/(n \times D) \leq 1.05$ (n = integer from 1 to 5) is satisfied where L is a distance between the first line sensor and the second line sensor in the first direction, and D is an outer periphery length of the roller.

2. The image reading apparatus according to claim 1, wherein the first line sensor and the second line sensor have an overlapped area in a reading range in the second direction, and the first line sensor and the second line sensor in the overlapped area satisfy the relation.

3. The image reading apparatus according to claim 1, further comprising a rotating member configured to prevent the roller from being sagged,
wherein a relation of $0.98 \leq P/(m \times Q) \leq 1.02$ (m is an integer) is satisfied where P is an outer periphery length of the roller in a position where the roller and the rotating member are in contact with each other, and Q is an outer periphery length of the rotating member.

4. The image reading apparatus according to claim 3,
wherein the rotating member includes a first rotating member configured to support a first roller to prevent sagging, and a second rotating member and a third rotating member positioned adjacent with each other configured to support a second roller to prevent sagging, and
wherein the first rotating member is arranged between the second rotating member and the third rotating member in the second direction.

5. The image reading apparatus according to claim 1, wherein, before reading the document, an edge of the document is detected by the first line sensor and the second line sensor to acquire correction information about document reading.

6. An image reading apparatus comprising:
a reading unit having a configuration in which a plurality of line sensors, including a first line sensor and a second line sensor arranged apart in a first direction, are regularly arranged along a second direction intersecting with the first direction; and
a unit configured to move a document and the reading unit relatively in a first direction,
wherein before reading a document, an edge of the document is detected by the first line sensor and the second line sensor to acquire information for correcting a reading of the document, and
wherein the document is once fed back when the edge is detected and, then the reading of the document is started.

7. The image reading apparatus according to claim 6, wherein the information for correcting the reading of the document is acquired using an output detected by the first line sensor and the second line sensor even while the document is read.

8. The image reading apparatus according to claim 6, wherein information about a document tilt or a document distortion is acquired using the information acquired at a plurality of different positions in the second direction.

9. An image reading apparatus comprising:
a reading unit having a configuration in which a plurality of line sensors, including a first line sensor and a second line sensor arranged apart in a first direction, are regularly arranged along a second direction intersecting with the first direction; and
a unit configured to move a document and the reading unit relatively in a first direction,
wherein before reading a document, an edge of the document is detected by the first line sensor and the second line sensor to acquire information for correcting a reading of the document, and
wherein the correction is performed for a document that is being read or a document that is to be read next and after, based on the acquired information.

10. An image forming apparatus that includes the image reading apparatus according to claim 1.

11. An image forming apparatus that includes the image reading apparatus according to claim 6.

12. An image forming apparatus that includes the image reading apparatus according to claim 9.

* * * * *